Figure 1:
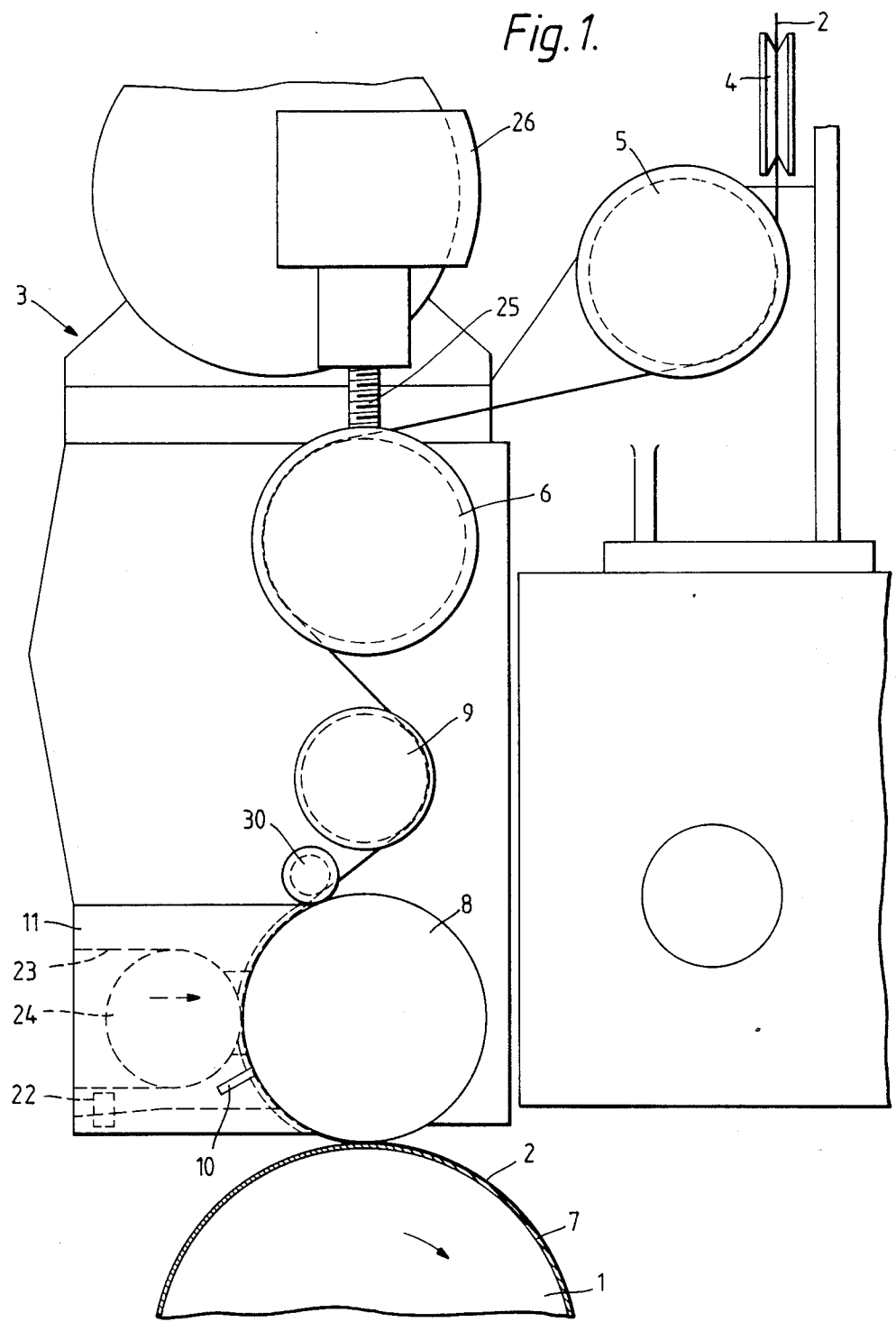

United States Patent [19]

Perkins

[11] Patent Number: 4,869,773
[45] Date of Patent: Sep. 26, 1989

[54] CORD GUIDE DEVICE

[75] Inventor: David J. B. Perkins, Woolton, United Kingdom

[73] Assignee: Apsley Metals Limited, United Kingdom

[21] Appl. No.: 116,779

[22] Filed: Nov. 5, 1987

[30] Foreign Application Priority Data

Nov. 8, 1986 [GB] United Kingdom ............... 8626731

[51] Int. Cl.⁴ .................. B29D 30/30; B29D 30/38
[52] U.S. Cl. .............................. 156/397; 156/405.1; 156/428; 156/436; 156/437; 242/4 B; 226/187
[58] Field of Search ............. 156/437, 176, 178, 436, 156/405.1, 406.4, 397, 428, 429; 242/48; 226/187

[56] References Cited

U.S. PATENT DOCUMENTS

| 2,512,762 | 6/1950 | Benson et al. ............. 156/437 |
| 2,819,760 | 1/1958 | Norehad ...................... 242/48 |
| 3,380,676 | 4/1968 | Jenny . | |
| 3,674,584 | 7/1972 | Klein ........................... 156/173 |
| 4,235,362 | 11/1980 | Hubenko ................... 226/187 X |
| 4,738,743 | 4/1988 | Satoh et al. ............. 156/406.4 X |

FOREIGN PATENT DOCUMENTS 3232162 1/1986 Fed. Rep. of Germany .
0546736 4/1958 Italy .

Primary Examiner—Michael W. Ball
Assistant Examiner—Jeff H. Aftergut
Attorney, Agent, or Firm—Stevens, Davis, Miller & Mosher

[57] ABSTRACT

A guide device (11) for feeding cord (2) from a source, such as a reel, to a mandrel (1) via an application roller (8). The device (1) has a body (12) housing a knife (10) for cutting the cord (2), and also houses a cord end retaining means (24) for holding the severed end of the cord from the reel after cutting. The retaining means is a resilient roller (24) which is biased against the application roller (8) to hold the severed cord end between the two rollers. Such a guide device can be used during the manufacture of a cord reinforced elastomeric ply for a pneumatic tire.

6 Claims, 2 Drawing Sheets

CORD GUIDE DEVICE

This invention relates to a guide device for feeding cord from a supply source e.g. a reel, to a point of application e.g. a mandrel.

Cord may be automatically fed from an endless source e.g. a reel to a point of application, where for example, in a process step, the cord may be wound around a mandrel. The cord must at some point in the process be cut so that a suitable length of cord for the particular application is fed to the mandrel. An automatic process gives rise to difficulties in that after cutting the cord to length, there is a problem in retaining the severed end of the cord feeding off the reel, and guiding the same severed cord end to its site of application for the next repeating process step.

Accordingly there is provided a guide device for feeding cord from a substantially endless source to a user site via an application roller, said device including a knife for cutting the cord into desired lengths, characterized in that the device includes a cord end retaining means for holding the severed cord end of the cord from the reel after cutting of the cord.

Preferably the cord end retaining means comprises a resilient roller housed within the guide device and which is biased against the application roller to hold the cord therebetween. Conveniently the guide device includes a spring loaded pressure foot having a cord guide groove at one end thereof and which is pivotted so as to hold the cord closely against the application roller adjacent its point of application to the user site.

Also according to this invention there is provided a method of manufacture of a cord reinforced elastomeric ply for a pneumatic tire and which includes feeding cord from a substantially endless source to a mandrel on which the cord reinforced ply is manufactured, said cord being fed via a cord laying head which traverses the axial length of the mandrel as said mandrel is rotated, to provide a desired density of cord windings around the mandrel, and after completion of the windings the cord is severed by a knife located in a cord guide device, which holds the end of the severed cord for commencement of winding the next ply.

Preferably the cord is laid onto the mandrel via an application roller located on the cord laying head, and the cord guide device acts to hold the severed end of the cord against the application roller.

The term 'cord' as well as including multi-filament twisted cord also embraces single filament type cords.

Figure 2:
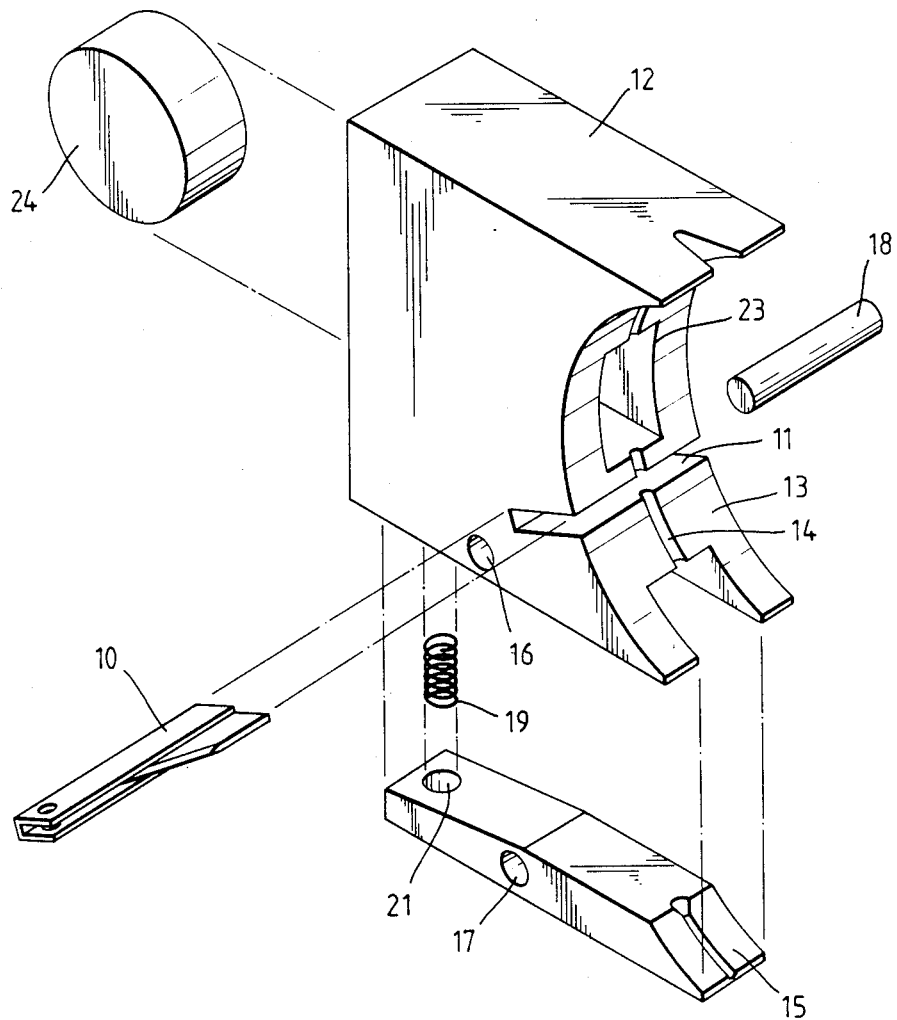

The invention will be described by way of example and with reference to the following drawings in which:

FIG. 1 is a side elevation of a cord winding station including a cord guide device according to this invention, FIG. 2 is an exploded perspective drawing of a guide device according to this invention.

In the manufacture of reinforced elastomeric plies for use as a carcass ply for a radial carcass pneumatic tire, it is known to make the ply by placing a layer of elastomeric material onto the outer cylindrical surface of a mandrel, and then helically wind a single cord around the mandrel on top of the elastomeric material. The cord is wound so that the windings of cord around the mandrel are substantially parallel to each other. A second elastomeric layer may then be applied over the cords if required. The cylindrical ply is then cut longitudinally of the mandrel to produce a flat ply reinforced by substantially parallel cords.

With reference to FIG. 1 of the drawings the cord 2 is fed from a relatively endless source such as a reel (not shown), or creel, to the mandrel 1. The cord 2 may be fed from the reel along some sort of overhead cord guide (not shown) to a cord laying head unit 3. The cord laying head unit may be mounted on guide bars to traverse in a direction parallel to the axis of the mandrel. The cord laying head 3 may be driven along the guide bars by a lead screw or other common suitable mechanisms, such that the linear speed of the carriage and the rotational speed of the mandrel are regulated to provide the desired density of cord windings around the mandrel. The cord laying unit 3 comprises pulleys 4 and 5, which change the direction of travel of the cord and feed it around a grooved roller 6. The cord 2 may be guided onto the roller 6 by a thread guide (not shown) and passes on to an application roller 8 arranged vertically beneath the roller 6, via an idler pulley 9. The rollers 6 and 8 may be connected by a timing belt—and are of dissimilar diameters, the application roller 8 having a larger diameter than roller 6 thereby inducing a controlled tension in the cord between the pulleys. Alternatively the rollers can be unconnected, and the tensioning of the cord is controlled by a separate unit arranged adjacent the cord source. The cord 2 is preferably passed around an additional grooved roller 30 at its contact point on the application roller 8. The additional roller 30 serves to steady the cord from vibrations and place it accurately onto the application roller. The tensioned cord 2 passing around the application roller 8 is laid as a progressive winding on a first layer of elastomeric material 7 by transverse movement of the laying head unit 3 which is driven at an appropriate speed relative to the speed of rotation of the mandrel. At the end of the winding, when the desired length of the cord layer has been achieved, the cord is severed by a pneumatically actuated knife 10 housed in a cord guide device 11.

The cord guide device 11 is illustrated in detail in FIG. 2, and is arranged on the head unit 3 adjacent the application roller 8. The knife 10 slides in an axially extending channel 11 formed in a block 12 forming the guide device body which is shaped to guide the cord around the roller 8. The body 12 has a curved surface 13 adjacent the roller 8 to accommodate the outer cylindrical surface thereof, the curved surface 13 having a circumferential groove 14 thereon so that the cord 2 passes through the groove 14 and is accurately laid on to the rubber-covered mandrel 1. The cord 2 is held closely against the application roller 8 at a position adjacent the mandrel 1 by a spring-loaded presser foot 15 having a continuation of the groove 14 thereon and which is pivoted in the block 12 by a pivot pin 18 passing through aligned bores 16 and 17, in the block and the foot respectively. The presser foot 15 is spring-loaded by a compression spring 19 fitting into a recess 21 in the foot and bearing against the end of a blind bore 22 (see FIG. 1) in the block 12.

A radial slot 23 is formed in the block 12 (that is radial with respect to the application roller 8 and opens into the curved surface 13). A rubber or nylon roller 24 having some inherent resilience serves to retain the severed cord end in the block after severance of a completed cord winding, is housed in the slot 23. After the severance of the cord 2 in the guide device, the rubber roller 24 holds the severed end in contact with the application roller 8, which in turn is in contact with the mandrel 1. The mandrel 1 indexes a small angle causing the application roller 8 to push the cord end to the groove 14 in the pressure foot 15 for the next application.

The cord laying head unit 3 is mounted so as to be vertically movable by a conventional lead screw 25 and drive mechanism 26 to engage and disengage respectively the application roller 8 with the rubber-covered mandrel 1 at the commencement and termination, respectively, of the cord winding process. A spring-loading device (not shown) being provided to maintain a standard constant loading on the application roller 8 when in engagement with the rubber-covered mandrel.

I claim:

1. A cord feeding apparatus for feeding cord from a substantially endless source thereof to an end user site, and which is for use in conjunction with an application roller having an outer cylindrical surface whereby said cord is laid onto the end user site, said cord feeding apparatus comprising; a body having a concave curved surface for accommodating the outer cylindrical surface of said application roller, and which has a slot therein which is radial with respect to the curved surface, a knife housed within the body for cutting the cord into desired lengths, and a cord end retaining roller for holding the severed end of the cord from said endless source after cutting of the cord, said end retaining roller being housed within said radial slot and being biased against the application roller to hold the cord therebetween.

2. A cord feed apparatus as claimed in claim 1 wherein the roller is of a resilient material and is biased against the application roller by its own inherent resilience.

3. A feed apparatus as claimed in claim 1 wherein the knife is located in an axially extending channel in said body which opens into said curved surface.

4. A cord feed apparatus as claimed in claim 1 wherein the feed apparatus further includes a spring loaded presser foot which is pivoted to said body, and has one end thereof which holds the cord closely against the application roller adjacent its point of application to the user site.

5. A cord feed apparatus as claimed in claim 4, wherein said curved surface on the body has a circumferentially extending cord guide groove therein, and there is a like groove in said one end of the presser foot.

6. A tire building apparatus for the manufacture of a cord reinforced elastomeric ply and which includes a cord laying head and a mandrel onto which the cord is wound, said cord laying head including a cord feeding apparatus for feeding cord from a reel to the mandrel, and an application roller having an outer cylindrical surface whereby the cord is laid onto the mandrel, said cord feeding apparatus comprising a body having a concave curved surface which accommodates the outer cylindrical surface of the application roller, and which has a slot therein which is radial with respect to the curved surface, a knife housed within the body for cutting the cord into desired lengths, and a cord end retaining roller for holding the severed end of the cord from the reel after cutting of the cord, said retaining roller being housed within said radial slot and being biased against the application roller to hold the cord therebetween.

* * * * *